United States Patent [19]
Yamamoto et al.

[11] Patent Number: 5,334,656
[45] Date of Patent: Aug. 2, 1994

[54] POLYESTER RESIN COMPOSITIONS

[75] Inventors: Naoki Yamamoto; Akira Yanagase; Akira Nakata; Atsunori Koshirai; Toshimi Yanai, all of Otake, Japan

[73] Assignee: Matsubishi Rayon Co., Ltd., Tokyo, Japan

[21] Appl. No.: 8,184

[22] Filed: Jan. 25, 1993

Related U.S. Application Data

[63] Continuation-in-part of Ser. No. 743,202, Aug. 9, 1991.

[30] Foreign Application Priority Data

Aug. 27, 1990 [JP] Japan .................. 2-224586

[51] Int. Cl.⁵ .................. C08F 283/12; C08F 299/08; C08L 51/08
[52] U.S. Cl. ........................ 525/63; 525/64; 525/445; 525/446; 525/903
[58] Field of Search .............. 525/63, 64, 445, 446, 525/907

[56] References Cited

U.S. PATENT DOCUMENTS 4,454,284  6/1984  Ueno et al. .
4,739,010  4/1988  McKee et al. .
4,882,381 11/1989  Wittman et al. .
4,918,132  4/1990  Hongo et al. .

FOREIGN PATENT DOCUMENTS 0367219  5/1990  European Pat. Off. .
3725576  2/1989  Fed. Rep. of Germany .
58-47419 10/1983  Japan .

*Primary Examiner*—Ralph H. Dean
*Attorney, Agent, or Firm*—Cushman, Darby & Cushman

[57] ABSTRACT

A polyester resin composition obtained by melt-mixing a mixture comprising resin components comprising as main resins
(A) a thermoplastic polyester resin and
(B) a polyorganosiloxane graft copolymer obtained by graft-polymerizing one or more kinds of vinyl monomer containing at least an epoxy group-containing vinyl monomer onto a compound rubber in which a polyorgano-siloxane rubber and a polyalkyl (meth)acrylate rubber have been inseparably united with each other. According to the present invention is provided a polyester resin composition in which the impact resistance of a thermoplastic polyester resin, a main constituent, has been improved over a wide temperature range including low temperatures below 0° C., and which provides molded products having good appearance.

11 Claims, No Drawings

POLYESTER RESIN COMPOSITIONS

CROSS-REFERENCE TO RELATED APPLICATION

This application is a continuation-in-part of U.S. Pat. application Ser. No. 07/743,202 filed Aug. 9, 1991.

BACKGROUND OF THE INVENTION

1. Field of the Invention

The present invention relates to a polyester resin composition improved in impact resistance, particularly impact resistance at low temperatures while maintaining its mechanical properties such as strength, stiffness and the like.

2. Description of the Prior Art

Hitherto, there have been proposed many methods for improving the mechanical properties (e.g. impact resistance) of thermoplastic polyester resins. Among these, relatively excellent methods are those described in Japanese Patent Application Kokoku No. 58-47419 and EP-A2-0367219. The former method is a method of blending a polyester resin and an α-olefin/glycidyl methacrylate/vinyl acetate copolymer, and the latter one is a method of blending a polyester resin and a graft silicone rubber obtained by graft-polymerizing an epoxy group-containing vinyl monomer onto a polyorganosiloxane polymer.

However, resin compositions obtained by the method described in Japanese Patent Application Kokoku No. 58-47419 have a problem that the impact resistance in the vicinity of room temperature is excellent, but that an improvement in impact strength at a low temperature below 0° C. is not sufficient, so that the range of application of the resin compositions is limited. Resin compositions obtained by the method described in EP-A2-0367219 have a problem that an improvement in impact strength is not sufficient, so that the appearance of molded products obtained therefrom is poor. The above resin compositions also have a problem that when they are put in wet heat conditions under pressure, mechanical properties become remarkably poor.

SUMMARY OF THE INVENTION

In view of the situation mentioned above, the present inventors have extensively studied to obtain a polyester resin composition in which the impact resistance of a thermoplastic polyester resin, a main constituent, has been improved over a wide temperature range including low temperatures below 0° C., and which provides molded products having a good appearance and is excellent in mechanical properties even in wet heat conditions under pressure. As a result, the present inventors have found that the above object can be attained by blending the thermoplastic polyester resin with a polyorganosiloxane graft copolyner resin obtained by graft-polymerizing one or more kinds of vinyl monomer containing at least an epoxy group-containing vinyl monomer onto a compound rubber in which a polyorgano-siloxane rubber and a polyalkyl (meth)acrylate rubber have been inseparably united with each other. The present inventors thus attained to the present invention.

The gist of the present invention consists in a polyester resin composition obtained by melt-mixing a mixture comprising resin components comprising as main resins (A) a thermoplastic polyester resin and (B) a polyorganosiloxane graft copolymer obtained by graft-polymerizing one or more kinds of vinyl monomer containing at least an epoxy group-containing vinyl monomer onto a compound rubber in which a polyorgano-siloxane rubber and a polyalkyl (meth)acrylate rubber have been inseparably united with each other. Particularly, this resin composition is very little deteriorated in mechanical properties even after it is put in wet heat conditions under pressure and hence usable in such conditions.

DESCRIPTION OF THE PREFERRED EMBODIMENTS

The thermoplastic polyester resin used in the present invention comprises as a main constituent (a) a polyester obtained by condensing an aromatic discarboxylic acid with a dihydric phenol, lower aliphatic diol or alicyclic diol, (b) an aromatic polyester derived from an aromatic hydroxycarboxylic acid or (c) a copolymer comprising (a) and (b).

The aromatic dicarboxylic acid used in the present invention is represented by the formula,

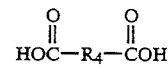

wherein $R_4$ represents a substituted or unsubstituted phenylene group, a group represented by the formula,

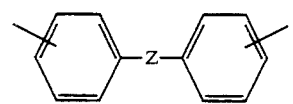

(in which Z represents a direct bond, —$CH_2$— or —CO—) or a naphthylene group.

The substituted phenylene group referred to herein means a phenylene group having 1 to 4 substituents. The substituent includes for example chlorine, bromine, methyl and the like. Specific examples of such the aromatic dicarboxylic acid include terephthalic acid, isophthalic acid, diphenyl-m,m'-dicarboxylic acid, diphenyl-p,p'-dicarboxylic acid, diphenylmethane-m,m'-dicarboxylic acid, diphenylmethane-p,p'-dicarboxylic acid, benzophenone-4,4'-dicarboxylic acid, naphthalene-dicarboxylic acid and the like. These aromatic dicarboxylic acids may be used alone or in admixture of two or more of them. Further, a small amount of aliphatic dicarboxylic acids such as adipic acid, sebacic acid and the like may be used together, so far as the physical properties of the polyester are not substantially reduced in practical use.

The dihydric phenol used in the present invention includes for example hydroquinone, resorcinol, dihydroxynaphthalene, biphenyldiol, 1,8-dihydroxyanthraquinone and compounds represented by the formula,

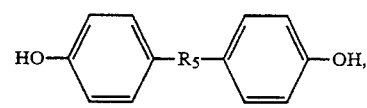

in which $R_5$ represents an oxygen atom, a sulfur atom, —CO—, —$SO_2$— or an alkylene group having 5 or less carbon atoms which may be substituted with a halogen.

Specific examples of the dihydric phenol include 2,2-bis(4-dihydroxylphenyl)propane (bisphenol A), 4,4'-dihydroxydiphenyl sulfone, 4,4'-dihydroxydiphenyl ether, 4,4'-dihydroxydiphenyl sulfide, 4,4'-dihydroxydiphenyl ketone, 4,4'-dihydroxydiphenylmethane, 1,1-bis(4-hydroxyphenyl)butane, 1,1-bis(4-hydroxyphenyl)-2,2,2-trichloroethane and the like.

The lower aliphatic diol used in the present invention is an alkylenediol having 2 to 6 carbon atoms. Its specific examples include ethylene glycol, propylene glycol, 1,4-butanediol, 1,5-pentanediol, 1,6-hexanediol and the like.

The alicyclic diol includes cyclohexanediol, cyclohexanedimethanol and the like. These dihydric phenol, lower aliphatic diol and alicyclic diol may be used alone or in admixture of two or more of them.

The aromatic hydroxycarboxylic acid used in the present invention includes a hydroxycarboxylic acid represented by the formula,

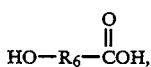

in which $R_6$ represents a phenylene group, a group represented by the formula,

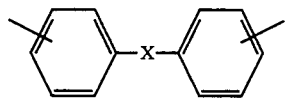

(in which X represents a direct bond or an alkylene group having 5 or less carbon atoms) or naphthylene group.

Specific examples of such the aromatic hydroxycarboxylic acid include m-hydroxybenzoic acid, p-hydroxybenzoic acid, 2-hydroxy-6-naphthoic acid, 2-(4-hydroxyphenyl)-2-(4'-carboxyphenyl)propane, 4-hydroxyphenyl-4-carboxyphenyl ether and the like. These aromatic hydroxycarboxylic acids may be used alone or in admixture of two or more of them.

Among these polyesters, polyethylene terephthalate, polybutylene terephthalate and poly(1,4-cyclohexanedimethylene terephthalate) are preferably used because when they are used as the polyester of the present invention, they exhibit impact resistance over a wider temperature range including low temperatures.

The polyorganosiloxane graft copolymer used in the present invention is obtained by graft-polymerizing one or more kinds of vinyl monomer containing at least an epoxy group-containing vinyl monomer onto a compound rubber comprising a polyorganosiloxane rubber and a polyalkyl (meth)acrylate rubber. As the polyorgano-siloxane rubber used herein, there can be used those which are obtained in the form of fine particles by emulsion polymerization of organosiloxane, a crosslinking agent for the polyorganosiloxane rubber (hereinafter referred to as crosslinking agent (I)) and if necessary a graft-linking agent for the polyorganosiloxane rubber (hereinafter referred to as graft-linking agent (I)).

As the organosiloxane used to prepare the polyorganosiloxane rubber, three or more-membered cyclic organosiloxanes are used, among which three to six-membered ones are preferably used. Examples of such the cyclic organosiloxane include hexamethylcyclotrisiloxane, octamethylcyclotetrasiloxane, dicamethylcyclopenta-siloxane, dodecamethylcyclohexasiloxane, trimethyltriphenylcyclotrisiloxane, tetramethyltetraphenylcyclotetrasiloxane, octaphenylcyclotetrasiloxane and the like. These cyclic organosiloxanes may be used alone or in mixture of two or more of them.

As the crosslinking agent (I) used to prepare the polyorganosiloxane rubber, trifunctional or tetrafunctional silanes, i.e. trialkoxyalkylsilanes, trialkoxyarylsilanes or tetraalkoxysilanes are used. Specific examples of such the crosslinking agent (I) include trimethoxmethylsilane, triethoxyphenylsilane, tetramethoxysilane, tetraethoxysilane, tetra-n-propoxysilane, tetrabutoxysilane and the like. As the crosslinking agent (I), tetraalkoxysilanes are preferred, among which tetraethoxysilane is particularly preferably used.

The graft-linking agent (I) used in necessary to prepare the polyorganosiloxane rubber is a siloxane having a functional group which does not react at the step of preparation of the polyorganosiloxane rubber, but reacts at the subsequent steps, i.e. at the step of preparation of the compound rubber in which the poly(meth)acrylate rubber is prepared by polymerization in the presence of the polyorganosiloxane rubber, and the step of graft polymerization. As specific examples, compounds which can form a unit represented by either one of the formulae (I-1), (I-2), (I-3) and (I-4) are given:

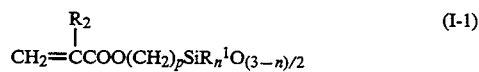

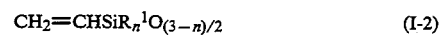

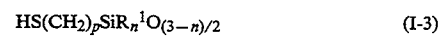

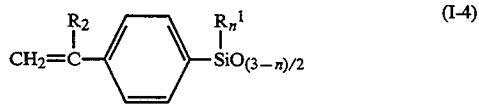

wherein $R^1$ represents a methyl, ethyl, propyl or phenyl group, $R^2$ represents a hydrogen atom or a methyl group, n represents an integer of 0, 1 or 2, and p represents an integer of 1 to 6. Among these, (meth)acryloyloxyalkylsiloxane which can form the unit represented by the formula (I-1) is desirable because it has a high grafting efficiency which makes it possible to form graft chains efficiently, as a result of which the composition of the present invention prepared therefrom acquires more superior impact resistance. Among (meth)acryloyloxyalkylsiloxanes capable of forming the unit represented by the formula (I-1), methacryloyloxyalkylsiloxane is preferred. Specific examples of methacryloyloxyalkylsiloxane include β-methacryloyloxyethyldimethoxymethylsilane, γ-methacryloyloxypropylmethoxy-dimethylsilane, γ-methacryloyloxypropyldimethoxy-methylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilane and the lile.

Vinylsiloxane which can form the unit represented by the formula (I-2) includes vinylmethyldimethoxysilane, vinyltrimethoxysilane and the like. Mercaptosiloxane which can form the unit represented by the formula (I-3) includes γ-mercaptopropyldimethoxymethylsilane, γ-mercaptopropyltrimethoxysilane, γ-mercaptopropyldiethoxyethylsilane and the like. Compounds which can form the unit represented by the formula (I-4) include p-vinylphenylmethyldimethoxysilane and the like.

The amount of the component derived from the cyclic organosiloxane is 60 wt. % or more, preferably 70 wt. % or more of the polyorganosiloxane rubber. The amount of the component derived from the crosslinking agent (I) is 0.1 to 30 wt. % thereof, and that of the component derived from the graft-linking agent (I) is 0 to 10 wt. %.

For producing the latex of this polyorganosiloxane rubber component, methods described, for example, in U.S. Pat. Nos. 2,891,920, 3,294,725, etc. can be used. In practicing the present invention, it is preferred to produce the latex by the method in which a mixed solution of organosiloxane, the crosslinking agent (I) and if necessary the graft-linking agent (I) is shear-mixed with water with, for example, a homogenizer in the presence of a sulfonic acid emulsifier such as an alkylbenzenesulfonic acid, an alkylsulfonic acid and the like. As the sulfonic acid emulsifier, an alkylbenzenesulfonic acid is preferably used because it acts as an emulsifier for organosiloxane and at the same time acts as a polymerization initiator. In this case, it is preferred to use a metal salt of the alkylbenzenesulfonic acid or an alkylsulfonic acid together with the above sulfonic acid because the metal salt has an effect to keep the emulsified state of the polymer stable during the graft polymerization.

For producing the compound rubber, it is desirable to use the emulsion polymerization method. That is, it is desirable to firstly prepare the polyorganosiloxane rubber by the emulsion polymerization method, and then to subject a monomer for synthesizing the polyalkyl (meth)acrylate rubber to emulsion polymerization in the presence of the polyorganosiloxane rubber latex prepared above.

The polyalkyl (meth)acrylate rubber component constituting the compound rubber can be synthesized using an alkyl (meth)acrylate, a crosslinking agent for the polyalkyl (meth)acrylate rubber component (hereinafter referred to as crosslinking agent (II)) and a graft-linking agent for the same (hereinafter referred to as graft-linking agent (II)). The alkyl (meth)acrylate includes alkyl acrylates (e.g. methyl acrylate, ethyl acrylate, n-propyl acrylate, n-butyl acrylate, 2-ethylbenzyl acrylate) and alkyl methacrylates (e.g. hexyl methacrylate, 2-ethylhexyl methacrylate, n-lauryl methacrylate). Among the alkyl (meth)acrylates, n-butyl acrylate is preferably used.

As the crosslinking agent (II), polyfunctional (meth)acrylates can be used. Specific examples thereof include ethylene glycol dimethacrylate, propylene glycol dimethacrylate, 1,3-butylene glycol dimethacrylate, 1,4-butylene glycol dimethacrylate, allyl methacrylate and the like.

As the graft-linking agent (II), compounds having two kinds of unsaturated group different in reactivity therebetween are used. Examples of such the compound include allyl methacrylate, triallyl cyanulate, triallyl isocyanulate and the like. The three allyl groups of both triallyl cyanulate and triallyl isocyanulate seem to have reactivity of the same level, but after a first allyl group has reacted, second and third allyl groups react in different reactivity from that of the first one. Triallyl cyanulate and triallyl isocyanulate, therefore, can be considered to have unsaturated groups different in reactivity. In the case of allyl methacrylate having two unsaturated groups, one of the groups having lower reactivity also reacts in part during polymerization to work as crosslinking site, but does not react in full, so that the remaining unsaturated group works as grafting site during the subsequent graft polymerization. These crosslinking agents (II) and graft-linking agents (II) can be used alone or in combination of two or more of them. Hereupon it is desirable to cause allyl methacrylate to own the functions of the both, i.e. to use allyl methacrylate both as a crosslinking agent for the polyalkyl (meth)-acrylate rubber and as a graft-linking agent for the same.

The amount of any one of these crosslinking agent (II) and graft-linking agent (II) used is 0.1 to 10 wt. % of the polyalkyl (meth)acrylate rubber component. When allyl methacrylate is used as both the crosslinking agent (II) and the graft-linking agent (II), an effect that there is no need to further use other crosslinking agent (II) and graft-linking agent (II) is obtained by using the allyl methacrylate in amounts of 0.2 to 20 wt. % of the polyalkyl (meth)acrylate rubber component.

The polyalkyl (meth)acrylate rubber component can be formed by adding the above alkyl (meth)acrylate, crosslinking agent (II) and graft-linking agent (II) to the polyorganosiloxane rubber latex and subjecting the mixture to polymerization. These alkyl (meth)acrylate and both agents (II) may be added either in one portion or dropwise to the polymerization system. With the progress of the polymerization, the polyalkyl (meth)-acrylate rubber component formed by the polymerization and the polyorganosiloxane rubber component are entangled and united with each other at the interface of the both to form a crosslinked network. Particularly, when the graft-linking agent (I) has been used in producing the polyorganosiloxane rubber component, grafting of the polyalkyl (meth)acrylate rubber component onto the polyorganosiloxane rubber component also takes place. In either case, a compound rubber latex which cannot substantially be separated into both the rubber components is obtained.

This compound rubber has a structure that the polyorganosiloxane rubber component and polyalkyl (meth)acrylate rubber component have been entangled in part, united with each other and crosslinked in that state, so that it cannot be separated into both the rubber components by extraction with usual organic solvents such as acetone, toluene, etc.

A preferred compound rubber is one in which the component derived from the cyclic organosiloxane in the polyorganosiloxane rubber component has a repeating unit of dimethylsiloxane, and the alkyl (meth)acrylate constituting the polyalkyl (meth)acrylate rubber component is n-butyl acrylate.

The compound rubber is one which has such a structure that 1 to 99 wt. % of the polyorganosiloxane rubber component and 99 to 1 wt. % of the polyalkyl (meth)acrylate rubber component have been inseparably entangled and united with each other, and in which the total amount of both the components is 100 wt. %.

When the compound rubber in which the amount of the polyorganosiloxane rubber component exceeds 99 wt. % is used, the composition obtained therefrom gives molded products having a poor surface appearance. When the compound rubber in which the amount of the polyalkyl (meth)acrylate rubber component exceeds 99 wt. % is used, the composition obtained therefrom is low in impact resistance. Because of this, the compound rubber used in the present invention needs to be one in which the amount of any one of both the rubber components is in a range of 1 to 99 wt. %, provided that the total amount of both the components is 100 wt. %. Preferably, the amount of the polyorganosiloxane rubber component is 5 to 95 wt. %, and that of the polyalkyl (meth)acrylate rubber component is 95 to 5 wt. %.

The compound rubber thus obtained is graft-copolymerizable with a vinyl monomer.

The polyorganosiloxane graft copolymer is obtained by graft-polymerizing one or more kinds of vinyl monomer containing at least an epoxy group-containing vinyl monomer onto this compound rubber. If the graft copolymer is constituted so that the component derived from the epoxy group-containing vinyl monomer is contained in amounts of 1 to 40 wt. %, preferably 2 to 30 wt. %, more preferably 2 to 20 wt. % of the graft copolymer, other vinyl monomer than the epoxy group-containing vinyl monomer may be graft-polymerized together. When the amount of the component derived from the epoxy group-containing vinyl monomer is less than 1 wt. %, further less than 2 wt. % of the graft copolymer, compatibility between the polyester resin and polyorganosiloxane graft copolymer tends to become poor to result in insufficient development of the impact strength. On the other hand, even when the amount exceeds 40 wt. %, a further higher effect is not exhibited, and besides there is a possibility that the resin composition turns gel at the time of melt-kneading. In either case, there is a fear that the object of the present invention is injured, so that such the amounts outside the above range are not desirable.

The epoxy group-containing vinyl monomer includes glycidyl methacrylate, glycidyl acrylate, vinyl glycidyl ether, allyl glycidyl ether, glycidyl ether of hydroxyalkyl (meth)acrylate, glycidyl ether of poly-alkylene glycol (meth)acrylate, diglycidyl itaconate and the like. Among these, glycidyl methacrylate is preferably used.

The vinyl monomer copolymerizable with the epoxy group-containing vinyl monomer includes methacrylates (e.g. methyl methacrylate, 2-ethylhexyl methacrylate), acrylates (e.g. methyl acrylate, ethyl acrylate, butyl acrylate), aromatic alkenyl compounds (e.g. styrene, halogen-substituted styrene, α-methylstyrene, vinyltoluene) and vinyl cyanide compounds (e.g. acrylonitrile, methacrylonitrile). These monomers are used alone or in combination of two or more of them.

The proportion of the component derived from the grafted vinyl monomer in the graft copolymer is preferably 2 to 60 wt. %, more preferably 3 to 40 wt. % when the weight of the graft copolymer is taken as 100 wt. %.

Also, it is desirable for the polyorgano-siloxane graft copolymer to have an average particle size ranging from 0.08 to 0.6 μm. When the average particle size is less than 0.08 μm, it is liable to become difficult to obtain sufficient impact strength. When it is larger than 0.6 μm, there is a fear that the composition obtained gives molded products having a poor surface appearance. The polyorganosiloxane graft copolymer having such the average particle size can be obtained by one-stage or multi-stage emulsion graft-polymerization of one or more kinds of monomer containing the epoxy group-containing vinyl monomer in the presence of the above compound rubber latex. When the multi-stage graft-polymerization is carried out using the epoxy group-containing vinyl monomer and other monomer than the one above as the aforementioned one or more kinds of monomer containing the epoxy group-containing vinyl monomer, it is desirable to add the epoxy group-containing vinyl monomer at the last stage of the graft polymerization.

In this graft polymerization, the component alone corresponding to the branch of the graft copolymer, which refers herein to a component derived from one or more kinds of monomer containing the epoxy group-containing vinyl monomer, polymerizes by itself without grafting onto a trunk component which refers herein to the compound rubber, to produce the so-called free polymer as by-product. In other words, a mixture of the desired graft copolymer and the free polymer is obtained by the graft polymerization. In the present invention, however, this mixture is referred to as "graft copolymer".

The blending amount of the thermoplastic polyester resin and the polyorganosiloxane graft copolymer is preferably 1 to 40 parts by weight of the polyorganosiloxane graft copolymer to 99 to 60 parts by weight of the thermoplastic polyester resin, the total amount of the both being 100 parts by weight, in terms of the impact strength of the composition obtained. More preferably, the blending ratio is 5 to 50 parts by weight of the graft copolymer to 95 to 50 parts by weight of the polyester resin, the total amount of the both being 100 parts by weight. When the proportion of the polyorgano-siloxane graft copolymer is less than 1 part by weight, an effect to improve the impact resistance of the polyester resin is poor. When the proportion exceeds 40 parts by weight, the strength, stiffness and heat resistance of molded products obtained from the composition tends to be injured.

So far as the composition of the present invention contains the above resin components in the above blending ratio, a filler can be incorporated as an additional component into the composition in order to further improve the heat resistance, mechanical strength, etc. of the composition. As such as filler, those having a fibrous form, granular form, powdery form, etc. may be used.

The filler includes for example glass fibers, carbon fibers, potassium titanate, asbestos, silicon carbide, ceramics fibers, metal fibers, silicon nitride, aramide fibers, barium sulfate, calcium sulfate, calcium silicate, calcium carbonate, magnesium carbonate, antimony trioxide, zinc oxide, titanium oxide, magnesium oxide, iron oxide, molybdenum defulfide, mica, talc, kaolin, pyrophylite, bentonite, sericite, zeolite, wollastonite, other clays, ferrite, graphite, gypsum, glass beads, glass balloons, quarts, etc.

When these fillers are used, their amount used is preferably 10 to 300 parts by weight per 100 parts by weight of the total amount of the resin components comprising as main resins the polyester resin and polyorganosiloxane graft copolymer. When the amount is less than 10 parts by weight, an effect to improve the heat resistance, mechanical strength, etc. is small. When the amount exceeds 300 parts by weight, the melt-flowability of the composition becomes so poor that there is a fear that the appearance of molded products is injured.

If necessary, plasticizers, flame restardants, lubricants, pigments, etc. may be incorporated into the resin composition of the present invention.

For producing the resin composition of the present invention, any means may be used as far as the resin composition is obtained by melt-mixing at least the polyester resin and the polyorganosiloxane graft copolymer. It is however desirable to employ the following method: Firstly, the polyorganosiloxane graft copolymer latex is added to an aqueous metal salt solution containing, for example, calcium chloride or magnesium sulfate to salt it out and coagulate it, and the coagulated product is separated, recovered and dried. And then, the polyorganosiloxane graft copolymer dry powder thus obtained, the polyester resin and if necessary, the filler are added to an extruder, melt-kneaded and pelletized. The pellet thus obtained can be molded over a wide temperature range, and for example, it can be molded on a common injection molding machine.

The present invention will be illustrated specifically with reference to the following examples. In the examples, "part" means "part by weight". Physical properties in the examples and comparative examples were measured by the following methods under absolutely dried conditions.

Average particle size

Measured according to the guasi-elastic light scattering method (MALVERN SYSTEM 4600: measurement temperature, 25° C.; angle of scattering, 90 degrees) using an aqueous dilute solution of the latex as sample solution.

Izod impact strength

Measured according to ASTM D-256 using a test piece with a ⅛" notch.

Heat distortion temperature (HDT)

Measured according to ASTM D-648 using a high load of 18.6 kg/cm$^2$.

Surface appearance

Evaluated in two stages by visual assessment.
o No pearly luster.
x Pearly luster is observed.

Wet heat property

Test pieces were measured for tensile strength at break according to ASTM-D638 before and after they are subjected to a pressure cooker test at 120° C. and 100% RH for 50 hours. Thereafter, the tensile strength at break was measured again.

REFERENTIAL EXAMPLE 1

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture.

0.67 part of sodium dodecylbenzenesulfonate and 0.67 part of dodecylbenzenesulfonic acid were dissolved in 200 parts of distilled water, and to the resulting solution was added 100 parts of the above siloxane mixture. The resulting mixture was preliminarily stirred at 10000 rpm with a homomixer and then emulsified with a homogenizer under a pressure of 200 kg/cm$^2$ to obtain an organosiloxane latex. This latex was transferred to a separable flask equipped with a condenser and a stirring blade, and heated at 80° C. for 5 hours with stirring and mixing and then allowed to stand at 20° C. for 48 hours. Thereafter, this latex was neutralized to a pH of 7.5 with an aqueous sodium hydroxide solution to complete polymerization. Thus, a polyorganosiloxane rubber latex (hereinafter referred to as PDMS-1) was obtained. The conversion of the siloxane mixture to the polyorganosiloxane rubber was 88.6%, and the number average particle size of the polyorganosiloxane rubber was 0.22 μm.

35 Parts of PDMS-1 was sampled and put in a separable flask equipped with a stirring blade. After 175 parts of distilled water was added and the atmosphere in the flask was replaced by a nitrogen gas, the contents of the flask were heated to 50° C. At this temperature, a mixed solution of 78.4 parts of n-butyl acrylate, 1.6 parts of allyl methacrylate and 0.3 part of tert-butyl hydroperoxide was added.

Thereafter, a mixed solution of 0.002 part of ferrous sulfate, 0.006 parts of disodium ethylene-diaminetetraacetate, 0.3 part of Rongalite (sodium formaldehyde sulfoxylate) and 10 parts of distilled water was added, and radical polymerization was carried out while maintaining the inner temperature at 70° C. for 2 hours to obtain a compound rubber latex.

To this compound rubber latex was dropwise added a mixed solution of 10 parts of glycidyl methacrylate and 0.024 part of tert-butyl hydroperoxide over 15 minutes, and graft polymerization onto the compound rubber was carried out while maintaining the reaction solution at an inner temperature of 60° C. for 2 hours. The conversion of glycidyl methacrylate was 98.5%, and the number average particle size of the graft copolymer was 0.24 μm. This latex was added to a 5% aqueous calcium chloride solution at 40° C. so that the ratio of the latex to the aqueous solution was 1 : 2. Thereafter, the mixed solution was heated to 90° C. to coagulate the latex. After cooling, the solid matter was filtered off and dried overnight at 80° C. to obtain a powdery polyorganosiloxane graft copolymer (hereinafter referred to as S-1).

REFERENTIAL EXAMPLES 2 to 4

A compound rubber latex was obtained in the same manner as in Referential Example 1 except that:

(1) PDMS-1 (conversion to the polyorganosiloxane rubber, 88.6%; number average particle size, 0.22 μm) obtained in the same manner as in Referential Example 1 was sampled in amounts shown in Table 1, (2) distilled water was added thereto in amounts shown in Table 1, and (3) n-butyl acrylate, 1,3-butylene glycol dimethacrylate and triallyl cyanulate were used in amounts shown in Table 1 in place of 78.4 parts of n-butyl acrylate and 1.6 parts of allyl methacrylate.

To this compound rubber latex was dropwise added a mixed solution of 10 parts of methyl methacrylate and 0.03 part of cumene hydroperoxide over 20 minutes. After completion of the addition, the inner temperature was kept at 60° C. for 1 hour, after which a mixed solution of 5 parts of glycidyl methacrylate and 0.015 part of cumene hydroperoxide was dropwise added thereto over 10 minutes. After completion of the addition, the inner temperature was kept at 60° C. for 2 hours to complete graft polymerization. Thereafter, coagulation and drying were carried out in the same manner as in Referential Example 1 to obtain polyorganosiloxane graft copolymers S-2 and S-4. The number average particle size of these copolymers are shown in Table 1.

TABLE 1

|  | S-2 | S-3 | S-4 |
| --- | --- | --- | --- |
| Distilled water (part) | 200 | 175 | 175 |
| Polyorganosiloxane (part) | 35 | 138 | 241 |
| n-Butyl acrylate (part) | 72 | 42 | 12 |
| 1,3-Butylene glycol dimethacrylate (part) | 2 | 2 | 2 |
| Triallyl isocyanulate (part) | 1 | 1 | 1 |
| Number average particle size (μm) | 0.24 | 0.23 | 0.23 |

REFERENTIAL EXAMPLE 5 to 7

274 Parts of the compound rubber latex obtained in the same manner as in Referential Example 1 was put in a separable flask equipped with a stirring blade. After atmosphere in the flask was replaced by a nitrogen gas, the contents of the flask were heated to 60° C. At this temperature, a mixed solution of 7.5 parts of glycidyl methacrylate, each of monomers shown in Table 2 and 0.04 part of cumene hydroperoxide was dropwise added thereto over 20 minutes. After completion of the addition, graft polymerization onto the polyorganosiloxane rubber was carried out while maintaining the inner temperature at 60° C. for 2 hours. Thereafter, coagulation and drying were carried out in the same manner as in Referential Example 1 to obtain polyorganosiloxane graft copolymers S-5 to S-7. The average number particle size of these copolymers are 0.24 μm.

REFERENTIAL EXAMPLE 8

The dry powder of a polyorganosiloxane graft copolymer (hereinafter referred to as S-10) was obtained in the same manner as in Referential Example 1 except that as a monomer to be grafted onto the polyorganosiloxane compound rubber, 10 parts of methyl methacrylate was used in place of 10 parts of glycidyl methacrylate.

REFERENTIAL EXAMPLE 9

194 Parts of dimethyl terephthalate, 288 parts of 1,4-cyclohexanedimethanol and 10 parts of a n-butanol solution containing 14.4% of NaHTi(OC$_4$H$_9$)$_6$ were charged into a stainless steel reactor and heated to 190° C. to 200° C. with stirring. After methanol was completely distilled out of the reactor, the temperature was raised to about 270° C., and the pressure in the reactor was reduced to 1 mmHg. After the temperature was further raised to 300° C. to 310° C. in 1.5 hours, a nitrogen gas was introduced into the reactor to return the pressure in it to normal pressure. Thus, polycyclohexylenedimethylene terephthalate (hereinafter referred to as PCT) was obtained. The polymer obtained had a melting point of 290° C. to 300° C. and an intrinsic viscosity of 0.78.

EXAMPLES 1 to 10 AND COMPARATIVE EXAMPLES 1 to 7

Polybutylene terephthalate (trade name, TUFPET N-1000; produced by Mitsubishi Rayon Co., Ltd.) (hereinafter referred to as PBT) was used as the thermoplastic polyester resin. PBT was blended with the polyorganosiloxane graft copolymers S-1 to S-7 obtained in Referential Examples 1 to 7 in proportions shown in Table 3. Each mixture was fed to a twin-screw extruder (TEM-35B, produced by Toshiba Machine Co., Ltd.), melt-mixed at a cylinder temperature of 240° C. and then pelletized.

After the pellet obtained was dried, it was molded into test pieces with an injection molding machine (Promar injection molding machine, produced by Sumitomo Hearty Industries, Ltd.) at a cylinder temperature of 240° C. and at a mold temperature of 80° C. Evaluation of impact resistance and tensile strength at break were then carried out using the test piece. The results are shown in Table 2.

For comparison, the test piece was prepared and evaluation of physical properties was carried out in the same manner as above except that test samples described in the following Comparative Examples were used in place of the polyorganosiloxane graft copolymers:

(1) In Comparative Example 1, PBT alone was used.

(2) In Comparative Example 2, a rubber (hereinafter referred to as S-8) obtained by coagulating and drying the polyorganosiloxane rubber latex obtained in the course of production of S-1 in Referential Example 1, was used in place of the polyorganosiloxane graft copolymer.

(3) In Comparative Example 3, the coagulated and dried product (hereinafter referred to as S-9) of the compound rubber obtained in the course of production of S-1 in REFERENTIAL EXAMPLE 1, was used in place of the polyorganosiloxane graft copolymer.

(4) In Comparative Example 4, a copolymer (hereinafter referred as to S-10) obtained by grafting methyl methacrylate in place of the vinyl monomer containing glycidyl methacrylate in Comparative Example 4, was used in place of the graft copolymer used in the present invention.

(5) In Comparative Examples 5, 6 and 7, Bondfast E (α-olefin/glycidyl methacrylate copolymer produced by Sumitomo Chemical Co., Ltd.), which is a conventionally used impact resistance modifier, was used in place of the graft copolymer used in the present invention. The results are shown together in Table 2.

EXAMPLES 11 AND 12 and COMPARATIVE EXAMPLES 8 and 9

Procedure was carried out in the same manner as in Example 2 except that:

(1) PBT, a thermoplastic polymer resin, was replaced by polyethylene terephthalate (trade name, DIANITE PA-210; produced by Mitsubishi Rayon Co., Ltd.) (hereinafter referred to as PET) and polycyclohexylene-dimethylene terephthalate (PCT) obtained in Referential Example 9, and (2) the cylinder temperature of both the extruder and injection molding machine was set at 280° C. for PET and 310° C. for PCT, and the mold temperature of the both was set at 120° C. for either of PBT or PCT. The results of evaluation are shown in Table 2.

For comparison, the test piece was prepared using PET or PCT alone, and the impact resistance was evaluated with the test piece. The results are shown together in Table 2.

TABLE 2

| | Resin composition | | | | | | | | |
|---|---|---|---|---|---|---|---|---|---|
| | Graft copolymer | | | | | | | | |
| | Composition of compound rubber | | Composition of graft monomers | | | | | | |
| | Silicone rubber | Acrylic rubber | GMA | MMA | AN | ST | BA | (parts) | Polyester |
| Example 1 | 10 | 80 | 10 | | | | | S-1 20 | PBT 80 |
| Example 2 | 10 | 75 | 10 | | | | | S-2 20 | PBT 80 |
| Example 3 | 42 | 45 | 10 | | | | | S-3 20 | PBT 80 |
| Example 4 | 73 | 15 | 10 | | | | | S-4 20 | PBT 80 |
| Example 5 | 10 | 80 | 7.5 | 7.5 | | | | S-5 20 | PBT 80 |

TABLE 2-continued

| | | | | | | | | |
|---|---|---|---|---|---|---|---|---|
| Example 6 | 10 | 80 | 7.5 | | 2 | 5.5 | S-6 20 | PBT 80 |
| Example 7 | 10 | 80 | 7.5 | | | 7.5 | S-7 20 | PBT 80 |
| Example 8 | 10 | 75 | 5 | | | | S-2 20 | PBT 80 |
| Example 9 | 10 | 75 | 10 | | | | S-2 20 | PBT 80 |
| Example 10 | 10 | 75 | 10 | | | | S-2 20 | PBT 80 |
| Example 11 | 10 | 75 | 10 | | | | S-2 20 | PET 80 |
| Example 12 | 10 | 75 | 10 | | | | S-2 20 | PCT 80 |
| Comparative Example 1 | | | | | | | | PBT 100 |
| Comparative Example 2 | 100 | | | | | | S-8 20 | PBT 80 |
| Comparative Example 3 | 10 | 80 | | | | | S-9 20 | PBT 80 |
| Comparative Example 4 | 10 | 80 | 10 | | | | S-10 20 | PBT 80 |
| Comparative Example 5 | | | | | | | B-E 5 | PBT 95 |
| Comparative Example 6 | | | | | | | B-E 10 | PBT 90 |
| Comparative Example 7 | | | | | | | B-E 20 | PBT 80 |
| Comparative Example 8 | | | | | | | | PET 100 |
| Comparative Example 9 | | | | | | | | PCT 100 |

| | Izod impact strength (kg·cm/cm) | | HDT (°C.) | Appearance | Tensile strength at break (kg/cm²) | |
|---|---|---|---|---|---|---|
| | 23° C. | −10° C. | | | before the test | after the test |
| Example 1 | 85 | 81 | 58 | ○ | 373 | 321 |
| Example 2 | 106 | 102 | 56 | ○ | 376 | 302 |
| Example 3 | 105 | 100 | 57 | ○ | 374 | 299 |
| Example 4 | 99 | 92 | 57 | ○ | 372 | 296 |
| Example 5 | 89 | 80 | 57 | ○ | 368 | 302 |
| Example 6 | 103 | 95 | 58 | ○ | 375 | 310 |
| Example 7 | 95 | 90 | 57 | ○ | 371 | 306 |
| Example 8 | 35 | 30 | 60 | ○ | 502 | 403 |
| Example 9 | 43 | 36 | 59 | ○ | 438 | 351 |
| Example 10 | 108 | 103 | 55 | ○ | 320 | 254 |
| Example 11 | 64 | 45 | 77 | ○ | 413 | 335 |
| Example 12 | 49 | 38 | 98 | ○ | 332 | 266 |
| Comparative Example 1 | 4 | 3 | 61 | ○ | 560 | — |
| Comparative Example 2 | 27 | 25 | 56 | x | 370 | — |
| Comparative Example 3 | 24 | 23 | 55 | x | 366 | — |
| Comparative Example 4 | 25 | 21 | 55 | x | 372 | — |
| Comparative Example 5 | 30 | 16 | 58 | ○ | 498 | 197 |
| Comparative Example 6 | 42 | 23 | 55 | ○ | 432 | 171 |
| Comparative Example 7 | 84 | 42 | 54 | ○ | 367 | 144 |
| Comparative Example 8 | 3 | 2 | 81 | ○ | 608 | — |
| Comparative Example 9 | 3 | 2 | 103 | ○ | 480 | — |

Note:
B-E: Bondfast E (same applies also hereinafter)

EXAMPLE 13

20 Parts of S-2, 80 parts of PBT and 67 parts of Glass fiber was blended, pelletized and evaluated in the same manner as in Example 1.

The Izod impact strengths were 33 kg·cm/cm (23° C.) and 29 kg·cm/cm (−10° C.), and HDT was 202° C.

REFERENTIAL EXAMPLES 10 and 11

Two parts of tetraethoxysilane, 0 5 part of γ-methacryloyloxypropyldimethoxymethylsilane and 97.5 parts of octamethylcyclotetrasiloxane were mixed to obtain 100 parts of a siloxane mixture.

0.67 part of sodium dodecylbenzenesulfonate and 0.67 part of dodecylbenzenesulfonic acid were dissolved in 200 parts of distilled water, and the resulting mixture was added to 100 parts of the above siloxane mixture. The resulting mixture was preliminarily stirred at 10000 rpm with a homomixer and then emulsified with a homogenizer under a pressure of 200 kg/cm² to obtain an organosiloxane latex. This latex was transferred to a separable flask equipped with a condenser and a stirring blade, and heated at 80° C. for 5 hours with stirring and mixing and then allowed to stand at 20° C. for 48 hours. Thereafter, this latex was neutralized to a pH of 7.2 with an aqueous sodium hydroxide solution to complete polymerization. Thus, a polyorganosiloxane rubber latex (hereinafter referred to as PDMS-2) was obtained. The conversion of the siloxane mixture to the polyorganosiloxane siloxane rubber was 89.1%, an the average particle size of the polyorganosiloxane rubber was 0.19 μm.

This PDMS-2 was sampled in an amount shown in Table 3 and put in a separable flask equipped with a stirrer. After distilled water of an amount shown in Table 3 was added and the atmosphere in the flask was replaced by a nitrogen gas, the contents of the flask were heated to 50° C. At this temperature, a mixed solution of n-butyl acrylate and allyl methacrylate of amounts shown in Table 3 and 0.3 part of tert-butyl hydroperoxide was added. Thereafter, a mixed solution of 0.002 part of ferrous sulfate, 0.006 part of disodium ethylenediaminetetraacetate, 0.3 part of Rongalite and 10 parts of distilled water was added, and radical polymerization was carried out while maintaining the inner temperature at 70° C. for 2 hours to obtain a compound rubber latex.

To this compound rubber latex was dropwise added a mixed solution of 10 parts of methyl methacrylate and 0.03 part of cumene hydroperoxide over 20 minutes. After completion of the addition, the inner temperature was kept at 60° C. for 1 hour, after which a mixed solution of 5 parts of glycidyl methacrylate and 0.015 part of cumene hydroperoxide was dropwise added thereto over 10 minutes. After completion of the addition, the inner temperature was kept at 60° C. for 2 hours to complete graft polymerization. Thereafter, coagulation and drying were carried out in the same manner as in Referential Example 1 to obtain two kinds of polyorganosiloxane graft copolymer S-11 and S-12. The average particle size of these copolymers are shown in Table 3.

TABLE 3

|  | S-11 | S-12 |
| --- | --- | --- |
| Distilled water (part) | 96 | 39 |
| PDMS-2 (part) | 138 | 241 |
| n-Butyl acrylate (part) | 42 | 12 |
| Allyl methacrylate (part) | 0.8 | 0.24 |
| Average particle size (μm) | 0.24 | 0.23 |

REFERENTIAL EXAMPLE 12

283 Parts of PDMS-2 was put in a separable flask equipped with a stirring blade, the atmosphere in the flask was replaced by a nitrogen gas and the contents of the flask was heated to 60° C. At this temperature, a mixed solution of 0.002 part of ferrous sulfate, 0.006 part of disodium ethylenediaminetetraacetate, 0.3 part of rongalite and 10 parts of distilled water was added thereto. Thereafter, a mixed solution of 10 parts of methyl methacrylate and 0.03 part of cumene hydroperoxide was dropwise added thereto over 20 minutes. After completion of the addition, the inner temperature was kept at 60° C. for 1 hour, after which a mixed solution of 5 parts of glycidyl methacrylate and 0,015 part of cumene hydroperoxide was dropwise added thereto over 10 minutes. After completion of the addition, the inner temperature was kept at 60° C. for 2 hours to complete graft polymerization. The number average particle size of the graft copolymer latex obtained was 0.22 μm. Thereafter coagulation and drying were carried out in the same manner as in Referential Example 1 to obtain a polyorganosiloxane graft copolymer (hereinafter referred to as S-13).

REFERENTIAL EXAMPLE 13

200 Parts of distilled water and 1 part of sodium dodecylbenzenesulfonate were put in a separable flask equipped with a stirring blade. After the atmosphere in the flask was replaced by a nitrogen gas, the contents of the flask was heated to 50° C. At this temperature, a mixed solution of 83.5 parts of n-butyl acrylate, 1.5 parts of allyl methacrylate and 0.3 part of cumene hydroperoxide was added thereto. Thereafter, a mixed solution of 0.002 part of ferrous sulfate, 0,006 part of disodium ethylenediaminetetraacetate, 0.3 part of Rongalite and 10 parts of distilled water was added thereto. Radical polymerization was then carried out while maintaining the reaction solution at an inner temperature of 70° C. for 2 hours to obtain a polyacrylate rubber latex.

To this rubber latex was dropwise added a mixed solution of 10 parts of methyl methacrylate and 0.03 part of cumene hydroperoxide over 20 minutes. After completion of the addition, the inner temperature was kept at 60° C. for 1 hour, after which a mixed solution of 5 parts of glycidyl methacrylate and 0.015 part of cumene hydroperoxide was dropwise added thereto over 10 minutes. After completion of the addition, the inner temperature was kept at 60° C. for 2 hours to complete graft polymerization. Thereafter, coagulation and drying were carried out in the same manner as in Referential Example 1 to obtain a polyacrylate rubber graft copolymer (hereinafter referred to as S-14).

EXAMPLES 14 AND 15 AND COMPARATIVE EXAMPLES 10 AND 11

Polybutylene terephthalate (trade name, TUFPET N-1000; produced by Mitsubishi Rayon Co., Ltd.) used in Example 1 was used as the thermoplastic polyester resin. This polyester resin was blended with the polyorganosiloxane graft copolymers S-11 to S-14 obtained in Referential Examples 10 to 13 in proportions shown in Table 4. Each mixture was pelletized with a twin-screw extruder (TEM-35B, produced by Toshiba Machine Co., Ltd.). After the pellet obtained was dried, it was molded into test pieces with an injection molding machine (Promar injection molding machine, produced by Sumitomo Heavy Industries, Ltd.), and evaluation of the physical properties was carried out. The cylinder temperature of both the extruder and injection molding machine was set at 240° C., and the mold temperature of the both was set at 80° C. The results are shown in Table 4.

The test piece was prepared in the same manner as above using a copolymer obtained by grafting a monomer containing an epoxy group-containing vinyl monomer onto a polyorganosiloxane homorubber (Comparative Example 10) and a copolymer obtained by grafting a monomer containing an epoxy group-containing vinyl monomer onto a polyacrylate rubber (Comparative Example 11) in place of the graft copolymer used in the present invention. The evaluation of physical properties was then carried out. The results also are shown together in Table 4.

TABLE 4

| | Resin composition | | | | | | Izod impact strength | | HDT | | Tensile strength at break (kg/cm²) | |
|---|---|---|---|---|---|---|---|---|---|---|---|---|
| | Graft copolymer | | | | | | | | | | | |
| | Composition of compound rubber | | Composition of graft monomers | | | | (kg · cm/cm) | | | | before the test | after the test |
| | Silicone rubber | Acrylic rubber | GMA | MMA | (parts) | Polyester | 23° C. | −10° C. | (°C.) | Appearance | | |
| Example 14 | 41 | 42.8 | 5 | 10 | S-11 20 | PBT 80 | N.B. | 102 | 56 | ○ | 375 | 302 |
| Example 15 | 12 | 12.2 | 5 | 10 | S-12 20 | PBT 80 | 121 | 110 | 57 | ○ | 372 | 299 |
| Comparative Example 10 | 84 | | 5 | 10 | S-13 20 | PBT 80 | 22 | 21 | 56 | x | 368 | 142 |
| Comparative Example 11 | | 84 | 10 | 5 | S-14 20 | PBT 80 | 28 | 20 | 56 | ○ | 370 | 140 |

Note:
N.B.: Shows that the test sample was not broken. (same applies also hereinafter)

EXAMPLE 16

The latex of a graft copolymer (hereinafter referred to as S-15) was obtained in the same manner as in Referential Example 1 except that 10 parts of glycidyl acrylate was used in place of 10 parts of glycidyl methacrylate. The conversion of glycidyl acrylate was 97.9%, and the average particle size of the graft copolymer latex was 0.23 μm. This latex was coagulated, filtered off and dried in the same manner as in Referential Example 1 to obtain a dry powder. Evaluation was then carried out in the same manner as in Example 1 using this dry powder. The results are shown in Table 5.

EXAMPLE 17

The latex of a graft copolymer (hereinafter referred to as S-16) was obtained in the same manner as in Referential Example 1 except that a mixture of 5 parts of diglycidyl itaconate and 5 parts of methyl methacrylate was used in place of 10 parts of glycidyl methacrylate. The conversion of diglycidyl itaconate and methyl methacrylate was 98.1%, and the average particle size of the graft copolymer latex was 0.23 μm. This latex was coagulated, filtered off and dried in the same manner as in Referential Example 1 to obtain a dry powder. Evaluation was then carried out in the same manner as in Example 1 using this dry powder. The results are shown in Table 5.

polyalkyl (meth)acrylate rubber which have been inseparably united with each other.

2. A polyester resin composition according to claim 1, wherein said thermoplastic polyester resin is one or more members selected from the group consisting of polybutylene terephthalate, polyethylene terephthalate and poly(1,4-cyclohexanedimethylene terephthalate).

3. A polyester resin composition according to claim 1, wherein said compound rubber is one obtained by polymerizing an alkyl (meth)acrylate, a crosslinking agent for a polyalkyl (meth)acrylate rubber and a graft-linking agent for a polyalkyl (meth)acrylate rubber in the presence of a polyorganosiloxane rubber obtained by emulsion-polymerizing organosiloxane, a crosslinking agent for a polyorganosiloxane rubber and if necessary, a graft-linking agent for a polyorganosiloxane rubber.

4. A polyester resin composition according to claim 1, wherein the portion of component (B) derived from said epoxy group-containing vinyl monomer is 1 to 40 wt. % based upon the total weight of component (B).

5. A polyester resin composition according to claim 1, wherein the portion of component (B) derived from said epoxy group-containing vinyl monomer is 2 to 30 wt. % based upon the total weight of component (B).

6. A polyester resin composition according to claim 1, wherein the portion of component (B) derived from said one or more kinds of vinyl monomer, at least one of

TABLE 5

| | Resin composition | | | | | | | Izod impact strength | | HDT | | Tensile strength at break (kg/cm²) | |
|---|---|---|---|---|---|---|---|---|---|---|---|---|---|
| | Graft copolymer | | | | | | | | | | | | |
| | Composition of compound rubber | | Composition of graft monomers | | | | | (kg · cm/cm) | | | | before | after |
| | Silicone rubber | Acrylic rubber | MMA | GA | DGI | (parts) | Polyester | 23° C. | −10° C. | (°C.) | Appearance | the test | the test |
| Example 16 | 10 | 80 | | 10 | | S-15 20 | PBT 80 | N.B. | 103 | 56 | ○ | 374 | 322 |
| Example 17 | 10 | 80 | 5 | | 5 | S-16 20 | PBT 80 | N.B. | 104 | 57 | ○ | 372 | 318 |

Note:
N.B.: Shows that the test sample was not broken. (same applies also hereinafter)

What is claimed is:

1. A polyester resin composition obtained by melt-mixing a mixture comprising resin components comprising as main resins
  (A) a thermosplastic polyester resin and
  (B) a polyorganosiloxane graft copolymer obtained by graft-polymerizing one or more kinds of vinyl monomer, at least one of which is an epoxy group-containing vinyl monomer, onto a compound rubber comprising a polyorgano-siloxane rubber and a which is an epoxy group-containing vinyl monomer, in said polyorganosiloxane graft copolymer is 2 to 60 wt. % based upon the total weight of component (B).

7. A polyester resin composition according to claim 1, wherein the latex of said polyorganosiloxane graft copolymer has an average particle size of 0.08 to 0.6 μm.

8. A polyester resin composition according to claim 1, wherein the blending amount of said thermoplastic polyester resin and said polyorganosiloxane graft copolymer is 1 to 40 parts by weight of the latter to 99 to 60 parts by weight of the former, the total amount of the both being 100 parts by weight.

9. A polyester resin composition according to claim 1 which contains 10 to 300 parts by weight of a filler per 100 parts by weight of the total amount of the resin components comprising as main resins the thermoplastic polyester resin (A) and the polyorganosiloxane graft copolymer (B).

10. A polyester resin composition according to claim 1, wherein the portion of component (B) derived from said epoxy group-containing vinyl monomer is 2 to 20 wt. % based upon the total weight of component (B).

11. A polyester resin composition according to claim 1, wherein the portion of component (B) derived from said one or more kinds of vinyl monomer, at least one of which is an epoxy group-containing vinyl monomer, in said polyorganosiloxane graft copolymer is 3 to 40 wt. % based upon the total weight of component (B).

* * * * *